United States Patent
Meyers et al.

(10) Patent No.: US 11,294,969 B2
(45) Date of Patent: Apr. 5, 2022

(54) ADVANCED KEYWORD SEARCH

(71) Applicant: SmugMug, Inc., Mountain View, CA (US)

(72) Inventors: Aaron Meyers, Menlo Park, CA (US); Michael Diaz, Santa Clara, CA (US)

(73) Assignee: SmugMug, Inc., Mountain View, CA (US)

(*) Notice: Subject to any disclaimer, the term of this patent is extended or adjusted under 35 U.S.C. 154(b) by 0 days.

(21) Appl. No.: 16/890,308

(22) Filed: Jun. 2, 2020

(65) Prior Publication Data
US 2020/0410014 A1 Dec. 31, 2020

Related U.S. Application Data

(63) Continuation of application No. 14/737,987, filed on Jun. 12, 2015, now Pat. No. 10,671,677.

(51) Int. Cl.
*G06F 16/00* (2019.01)
*G06F 16/951* (2019.01)
*G06F 16/51* (2019.01)

(52) U.S. Cl.
CPC ............ *G06F 16/951* (2019.01); *G06F 16/51* (2019.01)

(58) Field of Classification Search
CPC ............................... G06F 16/951; G06F 16/51
USPC ........................................................ 707/707
See application file for complete search history.

(56) References Cited

U.S. PATENT DOCUMENTS

| | | | |
|---|---|---|---|
| 6,098,066 A | 8/2000 | Snow et al. | |
| 6,480,838 B1* | 11/2002 | Peterman | G06K 9/723 707/707 |
| 7,890,889 B2 | 2/2011 | Artman et al. | |
| 8,645,372 B2 | 2/2014 | Diamond et al. | |
| 8,868,593 B1* | 10/2014 | Zhang | G06F 16/248 707/769 |
| 10,318,491 B1* | 6/2019 | Graham | G06F 16/182 707/707 |
| 10,671,677 B2 | 6/2020 | Meyers | |
| 2002/0083054 A1* | 6/2002 | Peltonen | G06F 16/9535 707/707 |
| 2007/0162443 A1* | 7/2007 | Liu | G06F 16/9038 707/707 |
| 2012/0084277 A1* | 4/2012 | Barve | G06F 16/248 707/708 |
| 2013/0103675 A1* | 4/2013 | Tanaka | G06F 16/14 707/722 |
| 2016/0246816 A1* | 8/2016 | Abiri | G06F 16/148 707/707 |

OTHER PUBLICATIONS

U.S. Appl. No. 14/737,987 Final Office Action dated Aug. 21, 2019.
(Continued)

*Primary Examiner* — Alexandria Y Bromell
(74) *Attorney, Agent, or Firm* — Polsinelli LLP

(57) ABSTRACT

Embodiments described herein generally relate to searching of media items associated with one or more keywords. Content search features may be generated and configured to receive search scope selections. A root level limitation may be associated with a folder within a media organization architecture. A query limitation may be associated with the content search features. In certain embodiments, means for automatically correcting the search scope selections to satisfy the query limitation are provided.

19 Claims, 7 Drawing Sheets

(56) References Cited

OTHER PUBLICATIONS

U.S. Appl. No. 14/737,987 Office Action dated Apr. 4, 2019.
U.S. Appl. No. 14/737,987 Final Office Action dated May 22, 2018.
U.S. Appl. No. 14/737,987 Office Action dated Jul. 13, 2017.

* cited by examiner

ADVANCED KEYWORD SEARCH

CROSS-REFERENCE TO RELATED APPLICATION

The present application is a continuation and claims the priority benefit of U.S. patent application Ser. No. 14/737,987 filed Jun. 12, 2015, now U.S. Pat. No. 10,671,677, which is incorporated herein by reference in its entirety.

BACKGROUND

1. Field

Embodiments of the present disclosure generally relate to keyword searching of media items. More specifically, embodiments described herein relate to an advanced keyword search application.

2. Description of the Related Art

The adoption of computers and advent of increasingly affordable memory for storage of media has resulted in the creation of large repositories of media. For example, the storage of millions of digital photo can be achieved in a cost effective manner. Often, the photos may be accessed via an interface, such as a website. Various folders and galleries may be utilized to organize the photos in a logical manner and keywords may be associated with the photos to facilitate more efficient searching of the photos.

However, due to the sheer number of photos to be searched in a query for a specific photo or group of photos, search results may not adequately parse the folders or galleries to provide desirable or relevant results. For example, a keyword search may return hundreds or thousands of photos which are associated with a particular keyword when searching the entirety of the folder and gallery structure. Moreover, a user's keyword search for a specific photo may not match the keyword actually associated with the desired photo. As a result, finding a desired photo may be inefficient or nearly impossible when searching through a large repository of photos.

Thus, what is needed in the art are improved methods of keyword searching.

SUMMARY

In one embodiment, a method of keyword searching is provided. The method includes generating a first content search feature linked to a media organization architecture and receiving a first search scope selection via the first content search feature. A root level limitation may be associated with the media organization architecture in response to the first search scope selection. A second content search feature may be generated and linked to the root level limitation associated with the media organization architecture and a query limitation may be associated with the second content search feature. A second search scope selection may be received via the second content search feature and results of the second search scope selection may be displayed.

In another embodiment, a computer system for keyword searching is provided. The computer system includes a processor and a memory storing instructions that, when executed by the processor, cause the computer system to generate a first content search feature linked to a media organization architecture and receive a first search scope selection via the first content search feature. A root level limitation may be associated with the media organization architecture in response to the first search scope selection. A second content search feature may be generated and linked to the root level limitation associated with the media organization architecture and a query limitation may be associated with the second content search feature. A second search scope selection may be received via the second content search feature and results of the second search scope selection may be displayed.

In yet another embodiment, a non-transitory computer-readable storage medium is provided. The non-transitory computer-readable storage medium may store instructions that when executed by a processor, cause the processor to perform a keyword search, by performing the steps of generating a first content search feature linked to a media organization architecture and receiving a first search scope selection via the first content search feature. A root level limitation may be associated with the media organization architecture in response to the first search scope selection. A second content search feature may be generated and linked to the root level limitation associated with the media organization architecture and a query limitation may be associated with the second content search feature. A second search scope selection may be received via the second content search feature and results of the second search scope selection may be displayed.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein generally relate to searching of media items associated with one or more keywords. Content search features may be generated and configured to receive search scope selections. A root level limitation may be associated with a folder within a media organization architecture. A query limitation may be associated with the content search features. In certain embodiments, means for automatically correcting the search scope selections to satisfy the query limitation are provided. It is contemplated that utilizing the embodiments described herein may provide for improved searching of media items, and more specifically, media items associated with keywords and arranged in a hierarchical folder structure. Thus, a search for one or several specific media items from a repository of thousands, if not millions of media items, may be performed in an efficient and user-friendly manner.

The term "user" as used herein includes, for example, a person or entity that owns a computing device or wireless device; a person or entity that operates or utilizes a computing device or a wireless device; or a person or entity that is otherwise associated with a computing device or a wireless device. It is contemplated that the term "user" is not intended to be limiting and may include various examples beyond those described.

The term "owner" as used herein includes, for example, a person or entity that owns or manages media items; a person or entity that operates a website hosted by an advanced search application server; a person or entity that operates a website which incorporates features of an advanced search application; or a person or entity that otherwise controls searching parameters associated with media items. It is contemplated that the term "owner" is not intended to be limiting and may include various examples beyond those described.

The term "media" or "media item" as used herein includes, for example, messages, photos, videos, audio, blogs, advertisements, geotags, notifications, and various other types of media which may be consumed by a user. It is contemplated that the terms "media" or "media item" are not intended to be limiting and may include various examples beyond those described.

Figure 1:
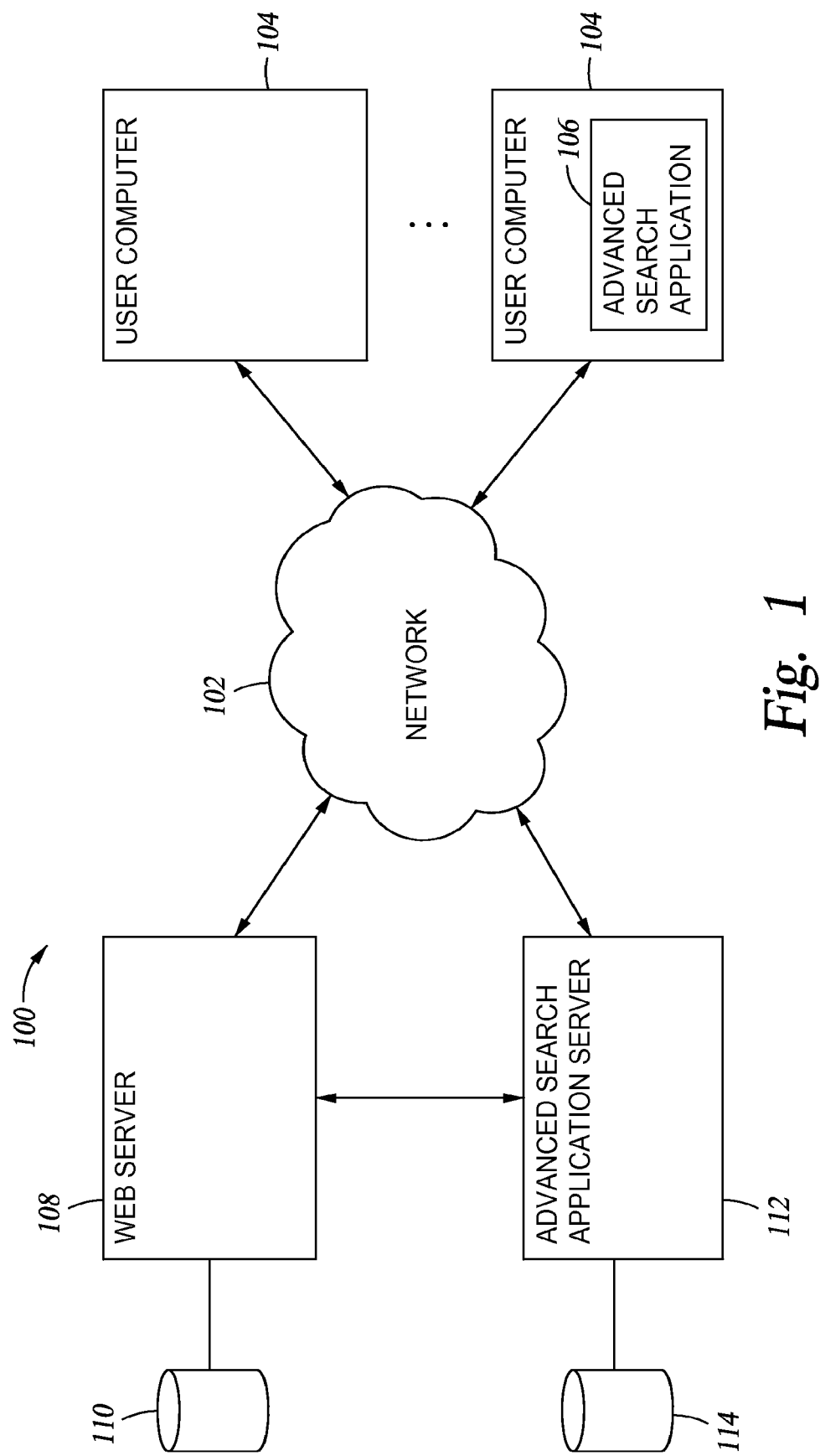
FIG. 1 illustrates a computer system configured for providing a website having an advanced search application according to embodiments described herein.

FIG. 1 illustrates a computer system 100 configured for providing an advanced search application 106. As shown, the computing system 100 may include a web server 108, an advanced search application server 112, and a plurality of user computers (i.e., mobile/wireless devices) 104 (only two of which are shown for clarity), each connected to a communications network 102 (e.g., the Internet). For example, the web server 108 may be programmed to communicate with the user computers 104 and the advanced search application server 112 using a networking protocol, such as TCP/IP protocol. The advanced search application server 112 may communicate directly with the user computers 104 through the communications network 102.

Each user computer 104 may include conventional components of a computing device, e.g., a processor, system memory, a hard disk drive, a battery, input devices such as a mouse and a keyboard, and/or output devices such as a monitor or graphical user interface (GUI), and/or a combination input/output device such as a touchscreen which not only receives input but also displays an output. The web server 108 and the advanced search application server 112 may include a processor and a system memory (not shown), and may be configured to manage, such as search and retrieve, media content stored in its respective content storage unit 110 and 114, respectively, using a file system and/or relational database software. The advanced search application server 112 may be configured to receive input from a user, such as a keyword for searching media items.

In the embodiments described below, users are respectively operating the user computers 104 that may communicate over the network 102 to request media from the advanced search application server 112. Each user computer 104 may be configured to execute a software application, such as the advanced search application 106, and access media items searchable by the advanced search application server 112. Media items displayed to a user as a result of a keyword search may be transmitted from the advanced search application server 112 to the user's computer 104 and processed by the advanced search application 106 for display through a GUI of the user's computer 104.

In one example, media displayed on the user's computer 104 may be one or more media items generated in response to the user's keyword search. The user's computer 104 may access the advanced search application server 112 which, in turn, retrieves one or more media items from a storage location (not shown) relevant to the keyword searched. The keyword search results may be displayed through the advanced search application 106 on the GUI of the user's computer when the user prompts executes a search operation utilizing the advanced search application 106.

It is noted that the user computer 104 may be a personal computer, laptop, mobile computing device, smart phone, video game console, home digital media player, network-connected television, set top box, and/or other computing devices having components suitable for communicating with the communications network 102. The user computer 104 may also execute other software applications configured to receive, categorize, and search media content and keyword information from the advanced search application server 112, such as, but not limited to, metadata analysis software, media display software, and/or widget platforms, among others.

Figure 2:
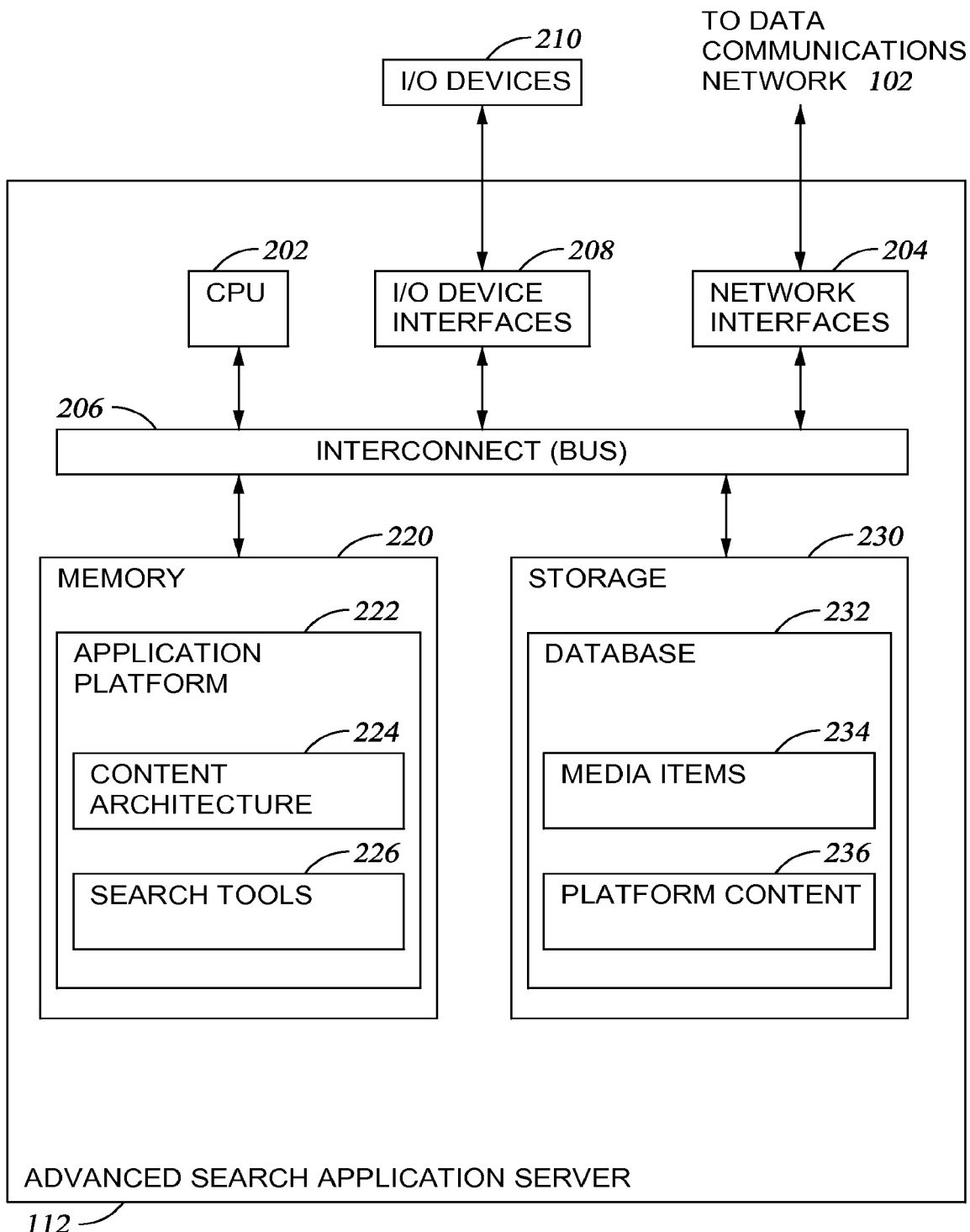
FIG. 2 illustrates a more detailed view of a server of FIG. 1 according to embodiments described herein.

FIG. 2 illustrates a more detailed view of the advanced search application server 112 of FIG. 1. The advanced search application server 112 includes, without limitation, a central processing unit (CPU) 202, a network interface 204, memory 220, and storage 230 communicating via an interconnect bus 206. The advanced search application server 112 may also include I/O device interfaces 208 connecting I/O devices 210 (e.g., keyboard, video, mouse, audio, touchscreen, etc.). The advanced search application server 112 may further include the network interface 204 configured to transmit data via the communications network 102. The CPU 202 retrieves and executes programming instructions stored in the memory 220 and generally controls and coordinates operations of other system components. Similarly, the CPU 202 stores and retrieves application data residing in the memory 220. The CPU 202 is included to be representative of a single CPU, multiple CPU's, a single CPU having multiple processing cores, and the like. The interconnect 206 is used to transmit programming instructions and application data between the CPU 202, I/O device interfaces 208, storage 230, network interface 204, and memory 220.

The memory 220 is generally included to be representative of a random access memory and, in operation, stores software applications and data for use by the CPU 202. Although shown as a single unit, the storage 230 may be a combination of fixed and/or removable storage devices, such as fixed disk drives, floppy disk drives, hard disk drives, flash memory storage drives, tape drives, removable memory cards, CD-ROM, DVD-ROM, Blu-Ray, HD-DVD, optical storage, network attached storage (NAS), cloud storage, or a storage area-network (SAN) configured to store non-volatile data.

The memory 220 may store instructions and logic for executing an application platform 222. The storage 230 may store media items and other searchable media content and may include a database 232 configured to store media items 234 searchable associated with application platform content 236. The database 232 may be any type of storage device. The database 232 may also store application content relating to keyword searching parameters, gallery/folder architecture, and other application features for providing the user with an application platform that displays media items 234 in response to a keyword search.

Figure 3:
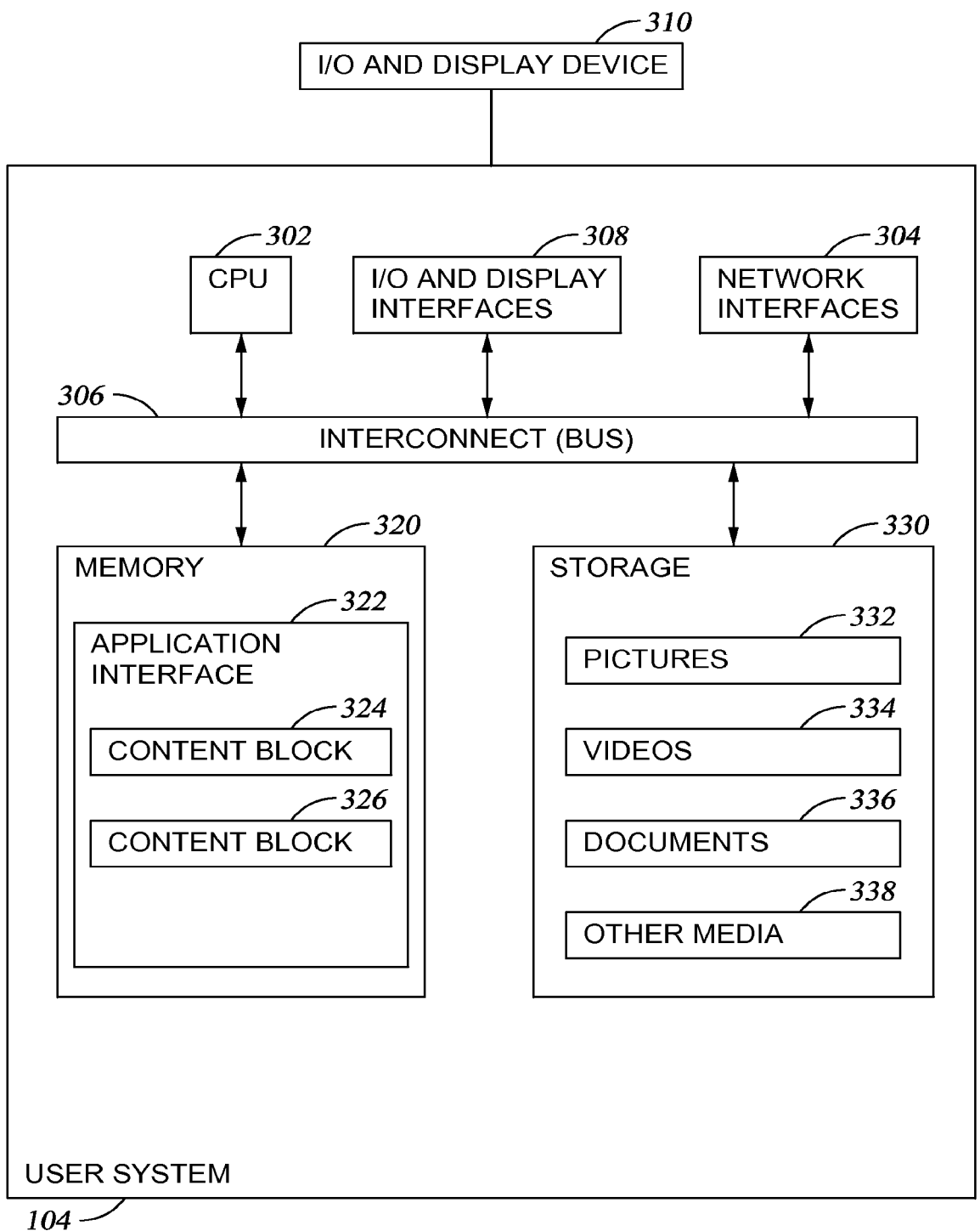
FIG. 3 illustrates a user computing system used to access a website and utilize the advanced search application according to embodiments described herein.

FIG. 3 illustrates the user computing system 104 used to access the advanced search application server 112 and display media items associated with the application platform 222 in response to a keyword search. The user computing system 104 may include, without limitation, a central processing unit (CPU) 302, a network interface 304, an interconnect 306, a memory 320, and storage 330. The computing system 104 may also include an I/O device interface 308 connecting I/O devices 310 (e.g., keyboard, display, touchscreen, and mouse devices) to the computing system 104.

Like CPU 202, CPU 302 is included to be representative of a single CPU, multiple CPUs, a single CPU having multiple processing cores, etc., and the memory 320 is generally included to be representative of a random access memory. The interconnect 306 may be used to transmit programming instructions and application data between the CPU 302, I/O device interfaces 308, storage 330, network interface 304, and memory 320. The network interface 304 may be configured to transmit data via the communications network 102, e.g. to receive results generated in response to a keyword search utilizing the advanced search application server 112. Storage 330, such as a hard disk drive or solid-state storage drive (SSD), may store non-volatile data. The storage 330 may contain pictures 332, videos 334, documents 336, and other media 338 which can be any type of media that may be retrieved by the advanced search application 106.

Illustratively, the memory 320 may include an application interface 322, which may include a first content block 324, and a second content block 326. The content blocks 324, 326 may be configured to receive search scope selections from a user within the advanced search application 106 via the application interface 322. As such, the application interface 322 may provide one or more software applications which allow the user to access media items and other content searchable on the advanced search application server 112.

Figure 4:
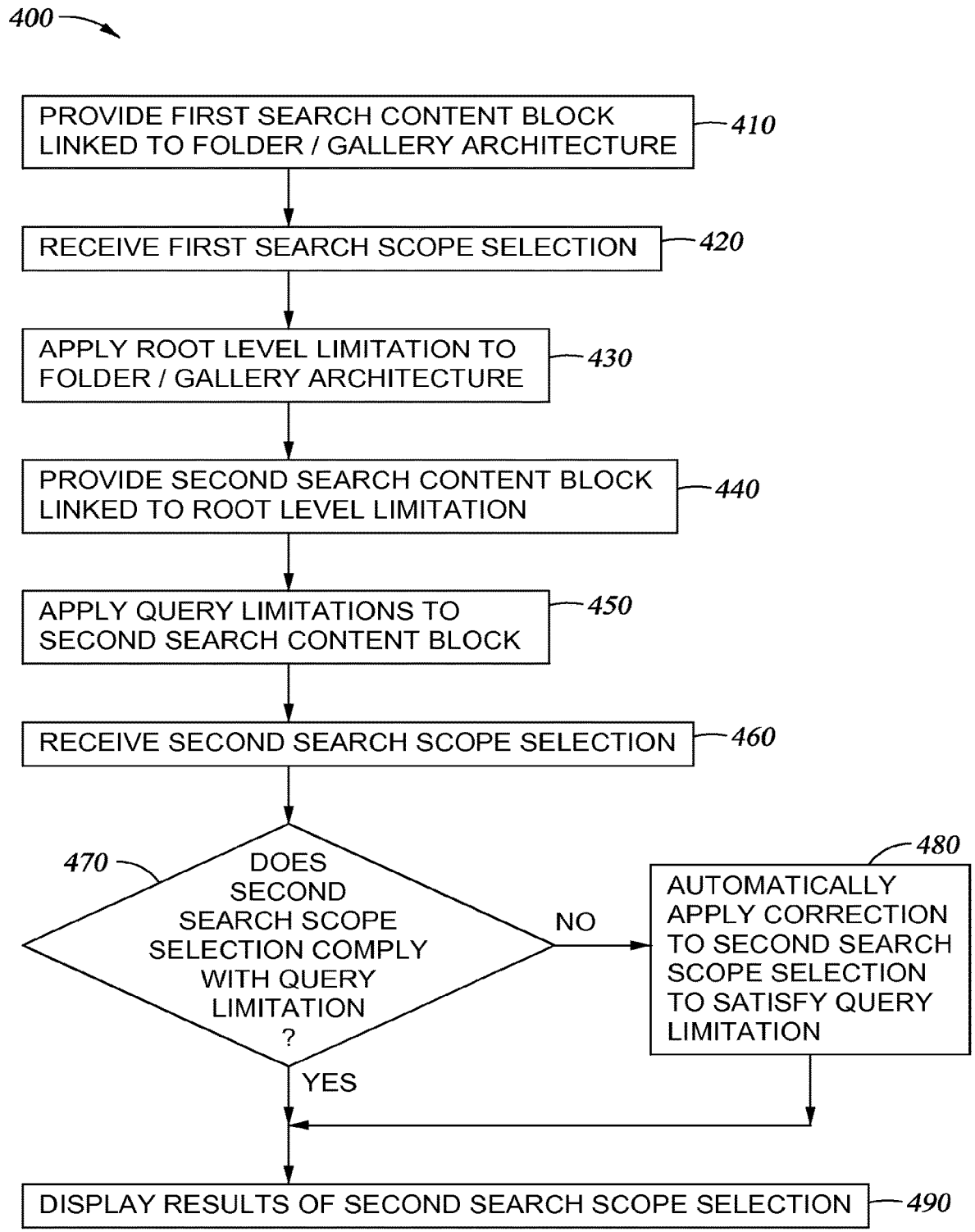
FIG. 4 schematically illustrates operations of a method for performing a keyword search according to embodiments described herein.

FIG. 4 schematically illustrates operations of a method 400 for performing a keyword search according to embodiments described herein. At operation 410, a first content search feature, such as the first content block 324, linked to a media organization architecture is provided. The first content search feature may be configured to receive input provided by a user of the advanced search application 106. The media organization architecture may be arranged as a folder and gallery structure, such as a hierarchical folder structure, which will be discussed in greater detail with regard to FIG. 5B. At operation 420, a first search scope selection may be received by the advanced search application 106. In one embodiment, the first search scope selection is input received via the first content search feature to limit the breadth of a keyword search environment. For example, the first search scope selection may be an indication selecting a folder within the hierarchical folder structure.

At operation 430, a root level limitation may be associated with the media organization architecture. For example, the advanced search application 106 may be configured by an owner of media content searchable by the advanced search application server 112 to associate the first search scope selection received via the first content search feature as the root level limitation. In one embodiment, a folder, generated and displayed in response to the first search scope selection, selected by a user may be utilized as the root level limitation. The root level limitation may be applied to the hierarchical folder structure to limit further keyword searching within the selected folder. The association of the root level limitation to the selected folder may be performed without the user's knowledge to improve the efficiency of subsequent searching operations performed by the user. In addition, by limiting the searching environment in response to association of the root level limitation to the selected folder, searching of higher order folders in the hierarchical folder structure may be prevented. However, the selected folder to which the root level limitation is applied and folders of lower order than the selected folder may be searchable in subsequent searching operations.

At operation 440, a second content search feature, such as the content block 326, may be provided and may be linked to the root level limitation. Accordingly, a search performed via the second content search feature is subject to the limitations of the root level limitation. In addition, a query limitation may be associated with the second content search feature, such as the content block 326, at operation 450. The query limitation may be customized by the owner of the media items searched by a user. In one embodiment, the query limitation is configured to modify a keyword search. The modification of the keyword search may be performed without knowledge of the user and the modification may or may not be visible to the user.

At operation 460, a second search scope selection may be received. For example, a user may enter a keyword into the second content search feature of the advanced search application 106. At operation 470, the advanced search application server 112 may analyze the keyword received via the second search scope to determine if the second search scope selection (i.e. the keyword) complies with the query limitation. If the second search scope selection does satisfy the query limitation, the advanced search application server 112 may generate and display results in response to the second search scope selection at operation 490.

If the second search scope selection does not satisfy the query limitation, at operation 480, the advanced search application server 112 may automatically correct the second search scope selection to satisfy the query limitation. In response to the correction of the second search scope selection and satisfaction of the query limitation, the advanced search application server 112 may generate and display the second search scope selection results at operation 490.

Utilizing the method 400, an owner of media items searchable via keywords may efficiently control searching parameters in an efficient and user friendly manner. In one embodiment, owner associations of the root level limitation and the query limitation are not visible to a user utilizing the advanced search application 106. In another embodiment, owner associations of the root level limitation and the query limitation are visible to a user utilizing the advanced search application 106. Thus, the advanced search application server 112 may provide an owner improved flexibility and/or transparency when designing search parameters associated with the owner's media items.

Figure 5A:
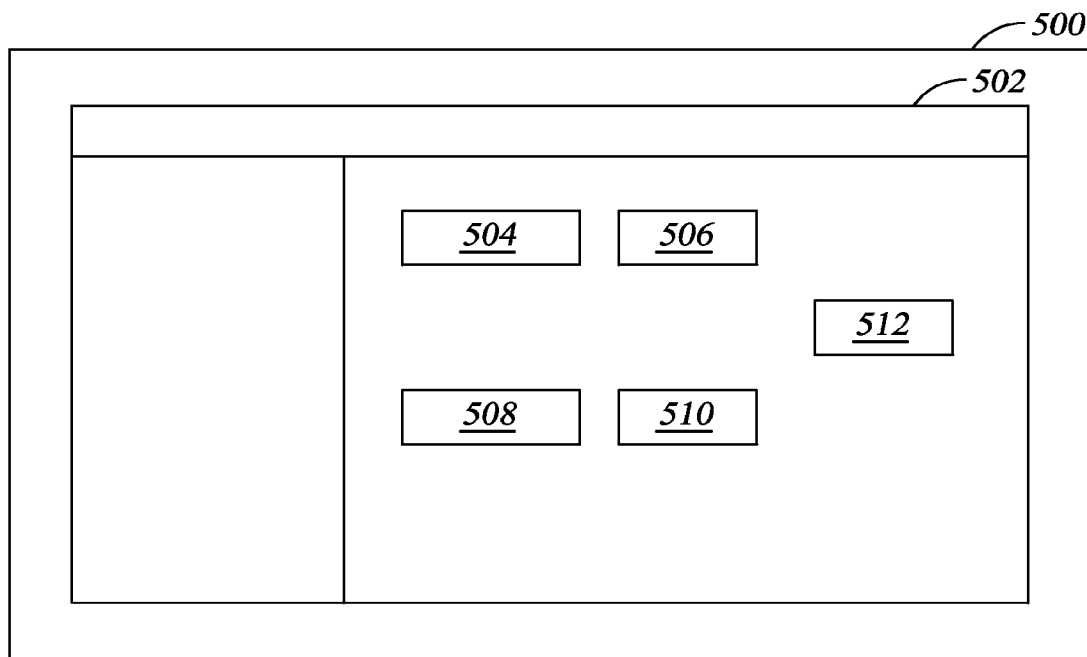
FIG. 5A schematically illustrates features of the advanced search application displayed on a graphical user interface according to embodiments described herein.

FIG. 5A schematically illustrates features of the advanced search application 106 displayed on a graphical user interface 500 according to embodiments described herein. The graphical user interface 500 may be a component of the user system 104 and may be configured to display a website 502 which incorporates the advanced search application 106. The advanced search application 106 may be accessible in the website 502 via the application interface 322. Generally, features provided in the application interface 322 are configured to be interactive with a user and receive input from the user. In one embodiment, the features of the application interface 322 may be searching parameters designed by an owner of media items.

In the embodiments described below, examples related to sporting event photography, specifically running event photographs, will be utilized. The examples described below are merely representative of exemplary embodiments and are not intended to be limiting, for the embodiments described herein are applicable to various species of keyword searching. In an illustrative example, the website 502 may be owned by a photographer (i.e. owner) and the website 502 may be hosted by the advanced search application server 112. Alternatively, the website 502 may be hosted by a third party server which performs operations associated with the advanced search application 106. The photographer may photograph running races and may offer photos of runners (i.e. users) for viewing or purchase by the runners.

A first context indicator 504 may be displayed on the website 502 utilizing the advanced search application 106. The first context indicator 502 may be customizable with alphanumeric characters to influence input received via a first content search feature 506. For example, the photographer may customize the first context indicator 502 with text, such as "select your race," to prompt a runner to select a specific race in which the runner participated. In one embodiment, the first content search feature 506 may be the first search scope selection described with regard to operation 420. In one embodiment, the first search scope selection received by the advanced search application server 112 via the first content search feature 506 is input received from the photographer. For example, the photographer may customize text associated with the first content search feature 506 such that the first content search feature 506 is populated with the word "race."

In another embodiment, the first search scope selection received by the advanced search application server 112 via the first content search feature 506 is input received from the user. In this embodiment, the first content search feature 506 may be a graphical control element, such as a drop-down menu, which offers various events for selection by the user. The graphical control element may be created and modified by the owner to efficiently categorize types of events photographed by the photographer. For example, the graphical control element associated with the first content search feature 506 may offer various events, such as races, weddings, etc. for selection by the user. It is contemplated that the first context indicator 502 may also be customized in association with the graphical control element in this embodiment. The example, the first context indicator 502 may be displayed as "select your event" when various types of events are provided by the owner for selection by the user.

The user may provide a first scope selection via the first content search feature 506 as described in operation 420 and a media organization architecture may be displayed to the user. For example, if a runner selects the first content search feature 506 displayed as "race," a hierarchical folder structure of races photographed by the photographer may be displayed to the runner.

Figure 5B:
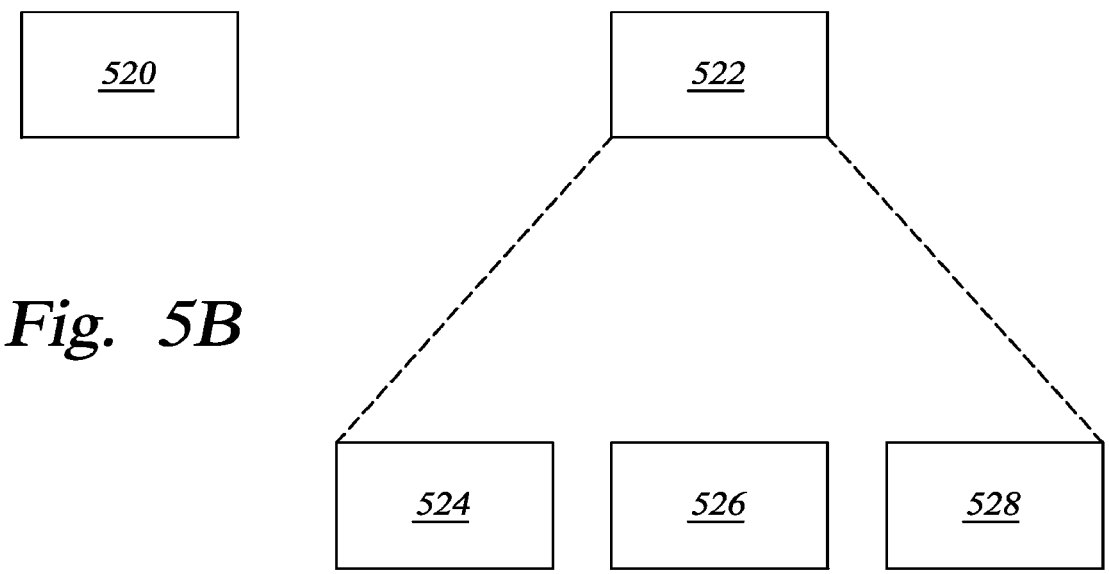
FIG. 5B schematically illustrates a media organization architecture according to embodiments described herein.

As illustrated in FIG. 5B, a media organization architecture including one or more folders may be displayed to a user. In the illustrated embodiment, a first folder 520 and a second folder 522 are provided. In one example, the first folder 520 may include one or more races photographed by the photographer during the 2014 calendar year and the second folder 522 may include one or more races photographed during the 2015 calendar year. The runner may select the desired folder, in this embodiment the second folder 522, to search for the race in which the runner participated. Upon selection of the second folder 522, one or more subfolders 524, 526, 528 may be displayed. Each subfolder 524, 526, 528 may contain photographs of a specific race. The runner may then select which race they participated in by selecting the appropriate subfolder. For example, the runner may select the subfolder 526 which is the "2015 Mountain View Half Marathon." In one embodiment, the selection of a subfolder subfolder 526) is the result of the first search scope selection. In another embodiment, the selection of the calendar year folder (i.e. second folder 522) is the result of the first search scope selection.

The root level limitation may be associated with the hierarchical folder structure such that subsequent searching is limited to a specified event. For example, if the root level limitation is associated with the second folder 522, subsequent searching operations may return results contained in the second folder 522 and results contained in the subfolders 524, 526, 528 but not results contained in the first folder 520. Thus, access to the first folder 520, which is a higher order file in the hierarchical folder structure, is restricted or prevented. Alternatively, if the root level limitation is associated with the subfolder 526, subsequent searching operations may return results contained in the subfolder 526 but not results contained in the subfolders 524, 528 of the second folder 522. Thus, the root level limitation provides for access to lower order folders within the hierarchical folder structure. For example, if one or more sub-subfolders were included within the subfolder 526, access to the sub-subfolders would be granted. It is contemplated that the photographer may predetermine the degree of granularity with regards to association of the root level limitation within the hierarchical folder structure.

In one embodiment, a title of the folder selected during the first search scope selection may be populated as text of the first content search feature 506. Thus, the folder within which the user is searching is displayed to the user. Referring back to the example illustrated above, the first search content feature 506 may be displayed as "2015 Mountain View Half Marathon" or may include other text identifying the folder selection, such as "SELECTED: 2015 Mountain View Half Marathon."

Referring back to FIG. 5A, a second context indicator 508 may be displayed on the website 502 utilizing the advanced search application 106. The second context indicator 508 may be customizable with alphanumeric characters to influence input received via a second content search feature 510. For example, the runner has selected to search within the "2015 Mountain View Half Marathon" and the second context indicator 508 may be displayed as "Enter your bib #" to facilitate a keyword search of photos contained within the "2015 Mountain View Half Marathon" folder. Thus, a user is prompted via the second context indicator 508 to enter information that will generate a result more likely intended by the user.

Prior to or during organization of photos in the media organization architecture, the photographer may tag various photos with keywords to facilitate more efficient searching of individual photos or groups of photos. For example, a runner's bib number may be manually tagged by the photographer as a keyword of the photo or additional metadata information may be manually or automatically tagged as keywords to photos. In one embodiment, photos may be tagged with keywords based on the filename of the photo.

The second content search feature 510 may be linked to the root level limitation to scope a user's search and the photographer may associate a query limitation to the second content search feature 510. It is contemplated that the query limitation may be any combination of alphanumeric characters. For example, the query limitation may require that a search term entered into the second content search feature 510 be a number. If the user were to enter a name, such as "Brian," the server would generate an error message prompting the user to enter a number. In another example, the photographer may require that the number entered into the second content search feature 510 be a specific number of digits, such 4 digits.

In this embodiment, the user may not be aware of the number of digits limitation, rather, the user may be prompted by the second context indicator 508 to enter the runner's bib number. If the runner's bib number for the "2015 Mountain View Half Marathon" was "0004," the runner may enter a single digit "4" which would prompt the advanced search application server 112 to make a determination whether the entered keyword satisfied the query limitation. In this example, a single digit does not satisfy the photographer's four digit query limitation. However, the advanced search application server 112 may automatically generate three zero's to satisfy the query limitation such that the keyword searched is "0004." In this embodiment, the automatic correction of a user entered keyword is the number zero positioned prior to the non-zero number entered by the user. The advanced search application server 112 may generate as many zero's as necessary to satisfy the query limitation.

Although the advanced application server 112 may automatically correct the keyword entered by the user, the correction may not be visible to the user. Upon entering a keyword into the second content search feature 510, the user may select a search operation 512. The search operation 512 may be a clickable button or the like and may be customized with text related to the search criteria. In one example, the search operation 512 may be presented to the user are a text box displayed as "FIND ME." It is contemplated that each of the first context indicator 504, the first content search feature 506, the second context indicator 508, the second content search feature 510, and the search operation 512 may be individually customizable with the photographer's desired text to create a more user friendly and directed keyword search.

Upon selecting the search operation 512, results of the search may be displayed to the user. Generally, media items, such as photos, may be displayed in a gallery format. The gallery format may display all results generated from the user's keyword search. In addition, functionalities associated with the gallery, such as purchasing, sharing, liking, viewing in a slideshow, and the like may be enabled for the photos displayed as results of the search.

Figure 6A:
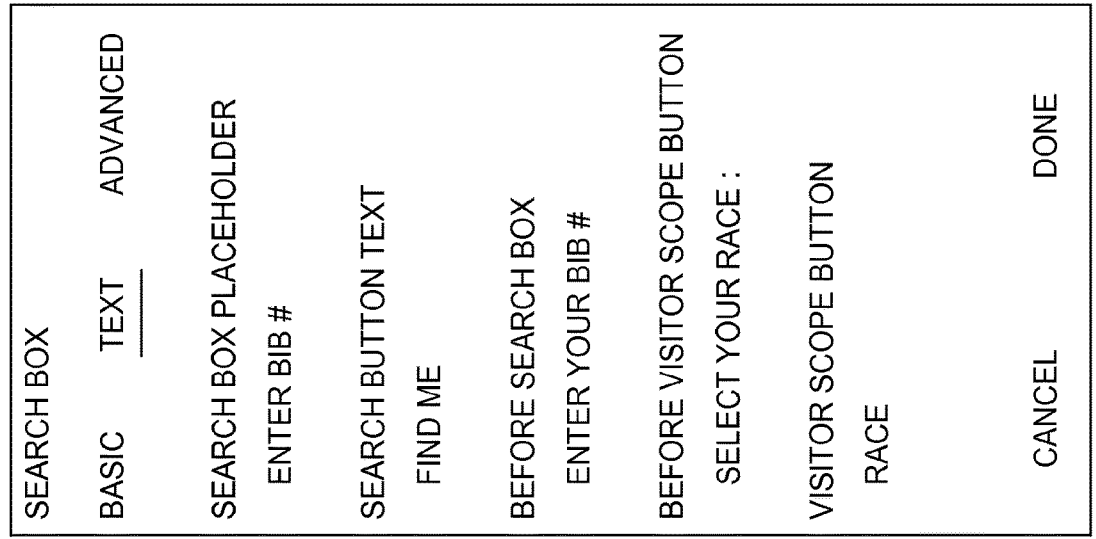
FIG. 6A illustrates search tools of an application platform according to embodiments described herein.
Figure 6B:
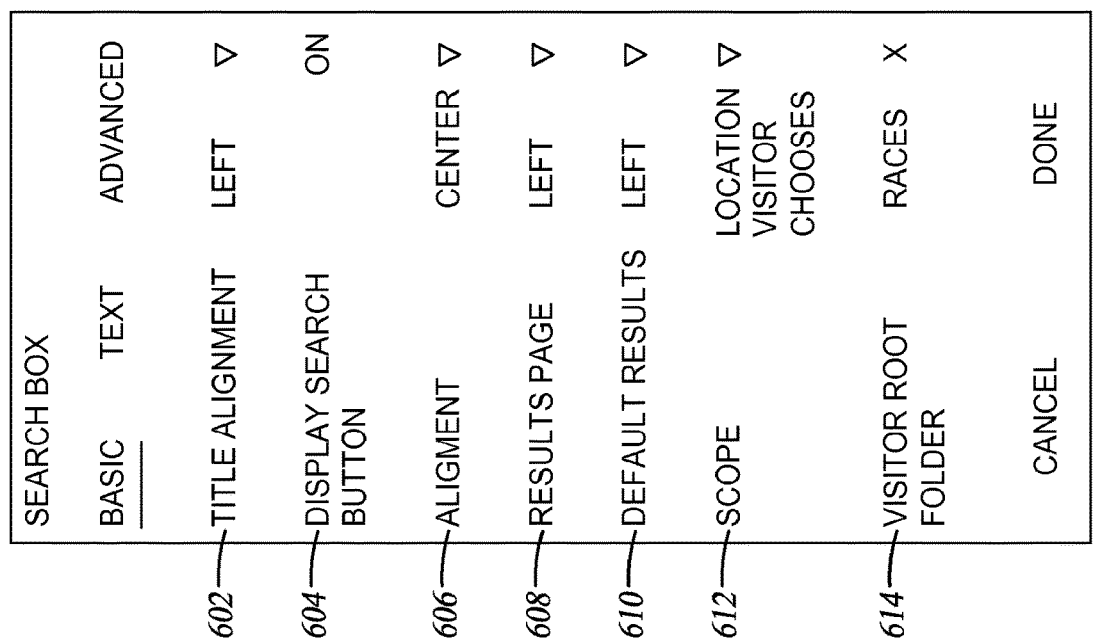
FIG. 6B illustrates search customization tools of the application platform according to embodiments described herein.
Figure 6C:
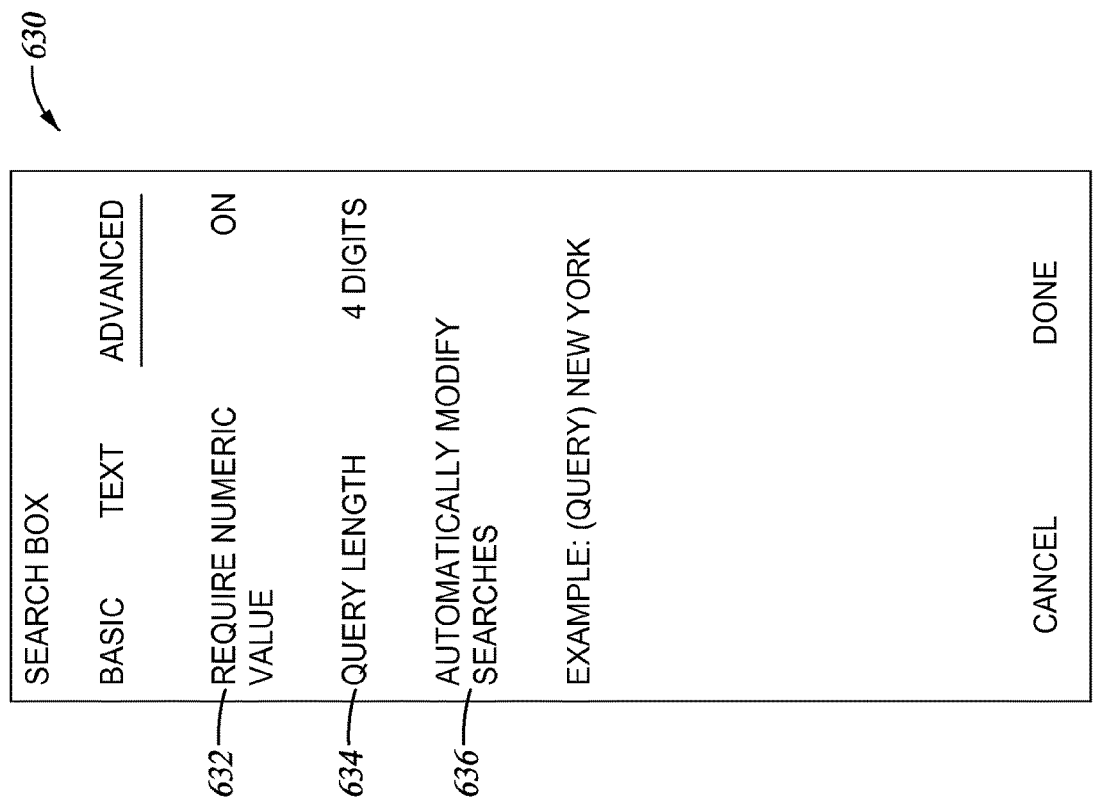
FIG. 6C illustrates a query limitation tool of the application platform according to embodiments described herein.

FIGS. 6A-6C generally illustrate search tools 226 provided in the application platform 222 that are customizable by an owner utilizing the advanced search application server 112. FIG. 6A illustrates a basic search tool 600 of the application platform 222 according to embodiments described herein. The basic search tool 600 may provide the owner with various tools for designing search parameters for display in the application interface 322. A title alignment tool 602 may be provided to enable alignment of a title the owner has associated with their website or with a specific keyword search. The title alignment tool 602 may include a graphical control element, such as a drop-down menu, to facilitate selection of a title position within the photographer's website 502. A display search tool 604 may be provided to enable a user to perform a keyword search of the photographer's media items. The display search tool 604 may include an ON/OFF toggle to allow the photographer flexibility in implementing keyword searching. In certain embodiments, the photographer may select ON to enable keyword searching or the photographer may select OFF to disable keyword searching, depending on the photographer's preferences. A search button alignment tool 606 may be provided similar to the title alignment tool 602 for positioning the search features, such as the first context indicator 504, the first content search feature 506, the second context indicator 508, the second content search feature 510, and the search operation 512. The search button alignment tool 606 may include a graphical control element to facilitate positioning of the search features within the website 502.

A results page tool 608 may be provided to designate the type of display associated with search results. The results page tool 608 may include a graphical control element linked to various media organization architectures, such as folders, galleries, and the like. A default results tool 610 may be provided to limit the types of results generated in response to a keyword search. The default results tool 610 may include a graphical control element configured to provide a selection of various media types, such as photos, videos, etc. For example, if photos are selected utilizing the graphical control element of the default results tool 610, search results of a keyword search may display photos instead of other media types.

A scope tool 612 may be provided to define searching parameters during a keyword search. The scope tool 612 may include a graphical control element containing various parameters, such as a location the user chooses or a location the owner chooses. In various embodiments, the scope tool 612 may be configured to define the degree of freedom with which a user performs a keyword search. A root folder tool 614 may be provided to further define searching parameters during a keyword search. The root folder tool 614 may include a graphical control element linked to various folders contained within the hierarchical folder architecture. In one embodiment, the owner may allow the user to define the root folder. In another embodiment, the owner may define the root folder.

FIG. 6B illustrates a text search customization tool 620 of the application platform 222 according to embodiments described herein. It is contemplated that each of the first context indicator 504, the first content search feature 506, the second context indicator 508, the second content search feature 510, and the search operation 512 may be individually customizable with the photographer's desired text to create a more user friendly and directed keyword search. Accordingly, the text search customization tool 620 enables the incorporation of customized text into the search features of the advanced search application 106. For example, the content blocks 324, 326 may be customized with text by the owner and displayed to the user via the application interface 322.

FIG. 6C illustrates a query limitation tool 630 of the application platform 222 according to embodiments described herein. A numeric value tool 632 may be provided to enable keyword searching utilizing one or more numeric values as described above. The numeric value tool 632 may include an ON/OFF toggle for designation of a numeric value requirement. A query length tool 634 may be provided to designate a predetermined query length as described above. It is contemplated that the query length may be customizable to include any desirable number of digits.

An automatic modifier tool 636 may also be provided to automatically modify a user's keyword search. The automatic modifier tool 636 may interact with one or both of the numeric value tool 632 and/or the query length tool 634 to automatically modify a keyword searched by a user. In addition to numeric values, it is contemplated that the automatic modifier tool 636 may also be customized with text to further modify a user's keyword search. The automatic modifier tool 636 may function as described with regard to operation 470 and operation 480.

As described in the aforementioned embodiments, an advanced search application is provided to improve keyword searches of media items. The advanced search application provides for improved customization of search parameters by an owner and for an improved user interface. Various search parameters may be predetermined by the owner without the knowledge of the user to facilitate a user friendly keyword search. By utilizing the embodiments described herein, an owner is provided improved control of searching parameters and a user may more efficiently perform a keyword search which results in results with improved relevancy without additional burdens on the user during the keyword searching operation.

While the foregoing is directed to embodiments described herein, other and further embodiments may be devised without departing from the basic scope thereof. For example, aspects of the present disclosure may be implemented in hardware or software or in a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the disclosed embodiments, are embodiments of the present disclosure. Therefore, the scope of the embodiments provided herein is determined by the claims that follow.

What is claimed is:

1. A method of keyword searching, comprising:
generating a first content search feature linked to a media organization architecture;
receiving a first search scope selection via the first content search feature;
associating a root level limitation to the media organization architecture in response to the first search scope selection;
generating a second content search feature linked to the root level limitation associated with the media organization architecture;
associating a query limitation to the second content search feature, wherein the query limitation is limited in scope based on the first search scope selection;
receiving a second search scope selection via the second content search feature;
comparing the second search scope selection to metadata of one or more media content in the media organization architecture;
correcting the second search scope when the query limitation is not satisfied; and
displaying results of the second search scope selection based on the comparison to the metadata.

2. The method of claim 1, further comprising influencing input received via the first content search feature with a first context indicator, wherein the first context indicator is customizable with alphanumeric characters.

3. The method of claim 1, further comprising influencing input received via the second content search feature with a second context indicator, wherein the second context indicator is customizable with alphanumeric characters.

4. The method of claim 1, wherein the query limitation restricts access to a higher order file in the media organization architecture than the root level limitation in response to the first scope selection.

5. The method of claim 1, further comprising customizing the display of the results of the second search scope selection.

6. The method of claim 1, further comprising a query limitation tool for designating a requirement for input of the query limitation.

7. The method of claim 6, wherein the requirement for the input of the query limitation is a numeric value.

8. The method of claim 6, wherein the requirement for the input of the query limitation defines a length of the query limitation.

9. The method of claim 1, further comprising matching the second search scope selection with at least one of a file name or a tag of a media.

10. A system for keyword searching, the system comprising:
a processor; and
a memory storing instructions that, when executed by the processor, cause the processor to: generate a first content search feature linked to a media organization architecture;
receive a first search scope selection via the first content search feature;
associate a root level limitation to the media organization architecture in response to the first search scope selection;
generate a second content search feature linked to the root level limitation associated with the media organization architecture;
associate a query limitation to the second content search feature, wherein the query limitation is limited in scope based on the first search scope selection;
receive a second search scope selection via the second content search feature;
compare the second search scope selection to metadata of one or more media content in the media organization architecture;

correct the second search scope when the query limitation is not satisfied; and display results of the second search scope selection based on the comparison to the metadata.

11. The system of claim 10, further comprising a first context indicator that influence input received via the first content search feature, wherein the first context indicator is customizable with alphanumeric characters.

12. The system of claim 10, further comprising a second context indicator that influence input received via the second content search feature, wherein the second context indicator is customizable with alphanumeric characters.

13. The system of claim 10, wherein the query limitation restricts access to a higher order file in the media organization architecture than the root level limitation in response to the first scope selection.

14. The system of claim 10, wherein the display of the results of the second search scope selection is customized.

15. The system of claim 10, further comprising a query limitation tool for designating a requirement for input of the query limitation.

16. The system of claim 15, wherein the requirement for the input of the query limitation is a numeric value.

17. The system of claim 15, wherein the requirement for the input of the query limitation defines a length of the query limitation.

18. The system of claim 10, wherein the second search scope selection is matched with at least one of a file name or a tag of a media.

19. A non-transitory computer-readable storage medium, having embodied thereon a program, the program being executable by a processor to perform a method for keyword searching, the method comprising:

generating a first content search feature linked to a media organization architecture;

receiving a first search scope selection via the first content search feature;

associating a root level limitation to the media organization architecture in response to the first search scope selection;

generating a second content search feature linked to the root level limitation associated with the media organization architecture;

associating a query limitation to the second content search feature, wherein the query limitation is limited in scope based on the first search scope selection;

receiving a second search scope selection via the second content search feature;

comparing the second search scope selection to metadata of one or more media content in the media organization architecture;

correcting the second search scope when the query limitation is not satisfied; and displaying results of the second search scope selection based on the comparison to the metadata.

* * * * *